(12) United States Patent
Lee

(10) Patent No.: US 6,935,368 B1
(45) Date of Patent: Aug. 30, 2005

(54) COLD-HOT WATER FAUCET

(76) Inventor: Jen-Chieh Lee, No. 47-2, Ju-Yi Road, Hsi-Chi Li, Ta Chia Township, Taichung Hsien (TW)

(*) Notice: Subject to any disclaimer, the term of this patent is extended or adjusted under 35 U.S.C. 154(b) by 174 days.

(21) Appl. No.: 10/444,441

(22) Filed: May 27, 2003

(51) Int. Cl.[7] ............................................. F16K 11/18
(52) U.S. Cl. ............ 137/597; 137/625.41; 137/625.47; 137/876
(58) Field of Search .................... 137/597, 625.41, 137/625.47, 876

(56) References Cited

U.S. PATENT DOCUMENTS

| | | | | |
|---|---|---|---|---|
| 1,856,380 A | * | 5/1932 | Foster | 137/597 |
| 2,031,932 A | * | 2/1936 | Cornell, Jr. | 137/597 |
| 4,469,121 A | * | 9/1984 | Moen | 137/100 |
| 4,741,363 A | * | 5/1988 | Hu | 137/607 |
| 5,050,641 A | * | 9/1991 | Shwu-Fen | 137/607 |
| 6,253,791 B1 | * | 7/2001 | Miklo | 137/876 |

* cited by examiner

Primary Examiner—Stephen M. Hepperle
(74) Attorney, Agent, or Firm—Harrison & Egbert

(57) ABSTRACT

A cold-hot water faucet includes a main tube and a shaft tube fitted rotatably into the main tube. The main tube is provided with a valve chamber and two fastening ports for fastening respectively with a cold water pipe and a hot water pipe. A ball valve is rotatably disposed in the valve chamber. The shaft tube is provided with a plurality of through holes corresponding in location to the ball valve and is further provided with two selection holes corresponding respectively to the fastening ports of the main tube. The on-off mechanism of the faucet is brought about by the ball valve and a rotary knob by which the ball valve is turned. The cold-hot water adjustment mechanism of the faucet is effected by the shaft tube and a selector by which the shaft tube is turned in relation to the main tube.

6 Claims, 7 Drawing Sheets

COLD-HOT WATER FAUCET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a water faucet, and more particularly to a cold-hot water faucet which is designed to cooperate with a hand-held shower head.

BACKGROUND OF THE INVENTION

The cold-hot water adjustment and the on-off control of the conventional cold-hot water faucet are integrated by a ceramic cut-out valve in conjunction with a swivel lever. The faucet is provided in the midsegment of an outlet thereof with a lift knob by which the water cut-out between the outlet and a hand-held shower head is controlled. The on-off control is attained by swiveling the swivel lever up or down, which the water temperature adjustment is attained by swiveling the swivel lever leftward or rightward.

Such a conventional cold-hot water faucet as described above is defective in design in that the swivel lever is often interfered by a hose which is connected between the outlet of the faucet and the hand-held shower head at the time when the shower head is moved around by a user. As a result, the swivel lever must be readjusted. In addition, the water cut-out operation between the outlet and the shower head is vulnerable to leak, due to the fact that the operation is attained by the spring force of the lift knob and the water pressure.

BRIEF SUMMARY OF THE INVENTION

The primary objective of the present invention is to provide a cold-hot water faucet which is free of the shortcomings of the conventional cold-hot water faucet described above.

In keeping with the principle of the present invention, the foregoing objective of the present invention is attained by a faucet comprising an on-off control mechanism and a cold-hot water adjustment mechanism. The on-off control mechanism is achieved by a ball valve in conjunction with a rotary knob, while the cold-hot water adjustment mechanism is brought about by a shaft tube in conjunction with a selector.

The features and the advantages of the present invention will be more readily understood upon a thoughtful deliberation of the following detailed description of the present invention with reference to the accompanying drawings.

DETAILED DESCRIPTION OF THE INVENTION

Figure 1:
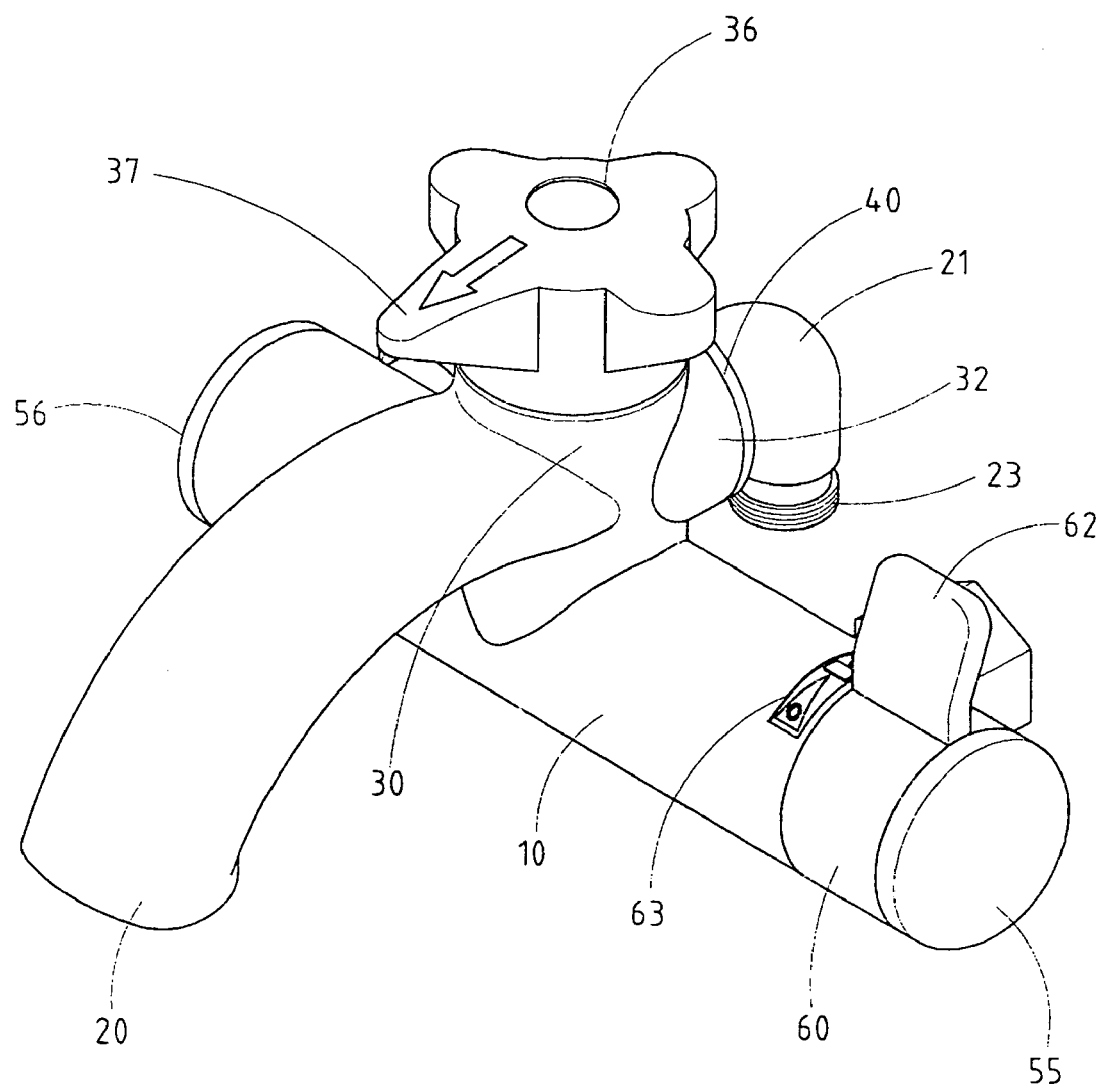
FIG. 1 shows a perspective view of the present invention.

As shown in FIGS. 1–6, a cold-hot water faucet embodied in the present invention comprises a main tube 10, a spout 20, a hose connector 21, a ball valve 33, a rotary knob 36, a shaft tube 50, and a selector 60.

The main tube 10 is provided at two opposite ends with a fastening port 11 which is fastened with a cold (hot) water pipe 12 in conjunction with a support member 13. The main tube 10 is provided with a valve chamber 30 extending therefrom such that the valve chamber 30 is located between the two fastening ports 11.

The spout 20 and the hose connector 21 are extended oppositely from the valve chamber 30. The hose connector 21 is used to connect one end of the hose of a hand-held shower head (not shown in the drawings). Instead of being extended from the valve chamber 30, the hose connector 21 is fastened at a fastening end 22 with a fastening hole 32 of the valve chamber 30 in conjunction with a seal ring 38, a washer 39, and a cover 40 which is provided with a fastening hole 41. The hose connector 21 has a connection end 23.

Figure 5:
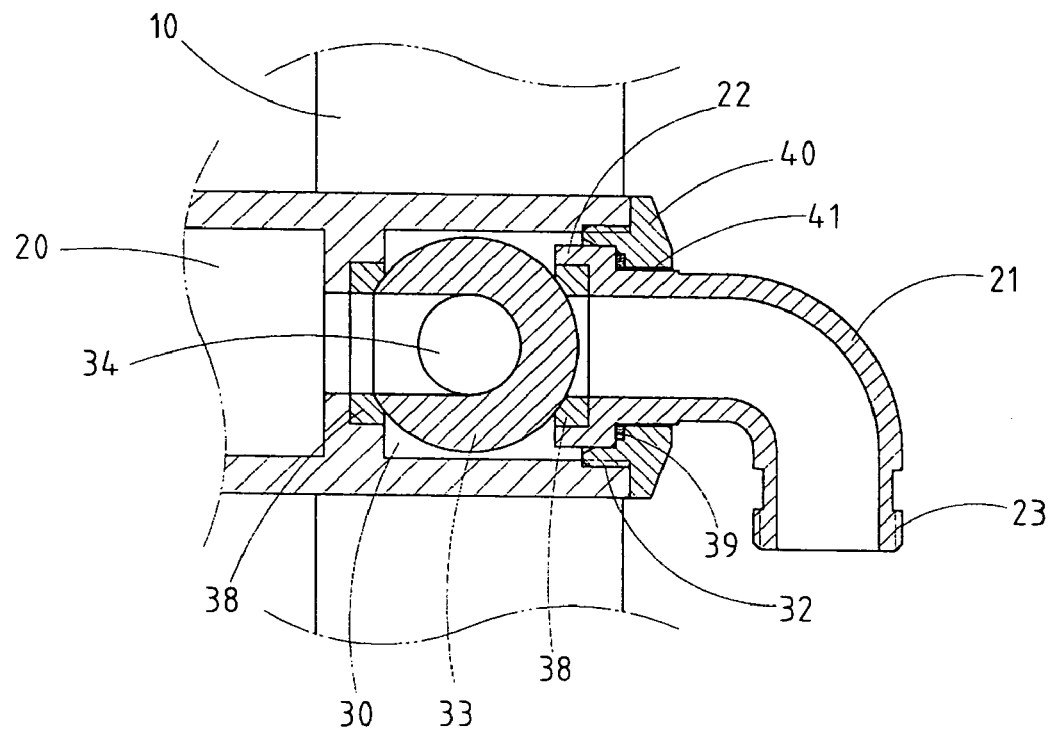
FIG. 5 shows a cross sectional view of the present invention.
Figure 6:
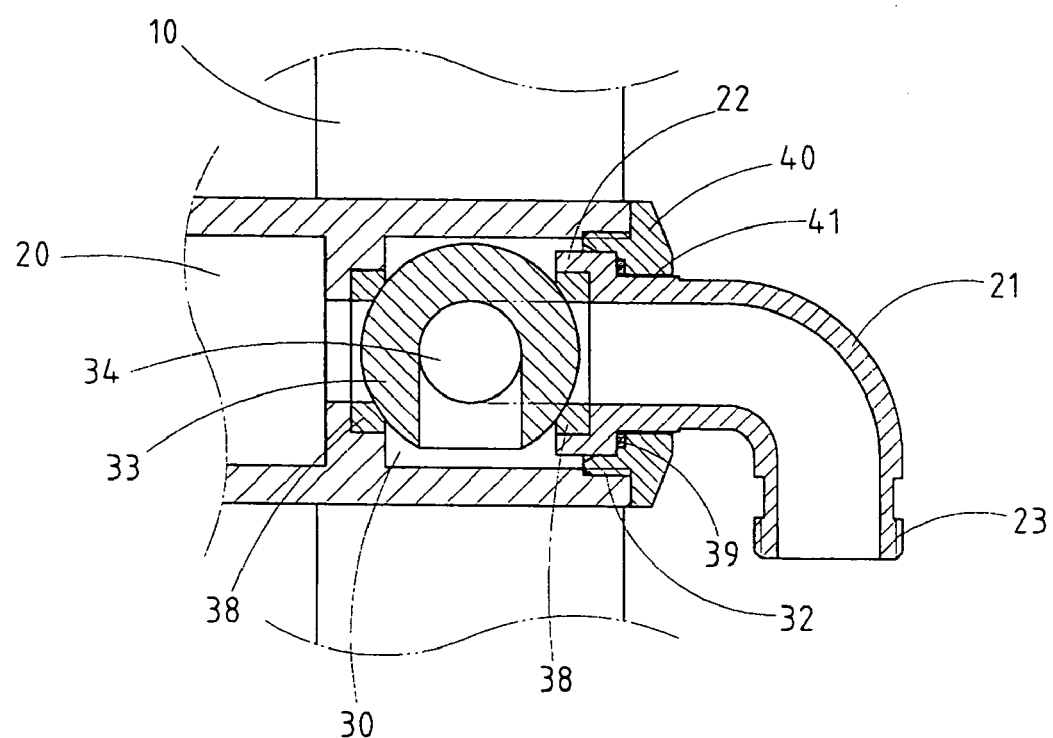
FIG. 6 shows another cross sectional view of the present invention.

The ball valve 33 is provided with a through hole 34 and a shaft 35. The ball valve 33 is rotatably disposed in the valve chamber 30 such that the shaft 35 is fastened with the rotary knob 36 via a shaft hole 31 of the valve chamber 30. It must be noted here that the ball valve 33 is disposed in the valve chamber 30 in conjunction with two seal rings 38 opposite to each other, as shown in FIGS. 5 and 6. The on-off control of the faucet is attained by the ball valve 33 and the rotary knob 36.

The shaft tube 50 is provided in a midsegment with a plurality of through holes 51. The midsegment of the shaft tube 50 may be provided with a recessed portion 510, which is intended to enhance the mixing of cold water and hot water and the flowing of water into the valve chamber 30. The shaft tube 50 is further provided in proximity of two opposite ends thereof with a selection hole 52. The shaft tube 50 is provided with a fastening end 53 and a cap 56 which is fastened with other end of the shaft tube. The shaft tube 50 is rotatably fitted into the main tube 10 such that the fastening end 53 of the shaft tube 50 is jutted out of an open end 14 of the main tube 10, so as to engage the selector 60 and a cap 55. The through holes 51 are corresponding in location to the ball valve 33, while the selection holes 52 are corresponding in location to the fastening ports 11 of the main tube 10. The shaft tube 50 is actuated by the selector 60 to turn in relation to the main tube 10, so as to allow the passage of cold water and hot water through the selection holes 52 respectively.

Figure 7:
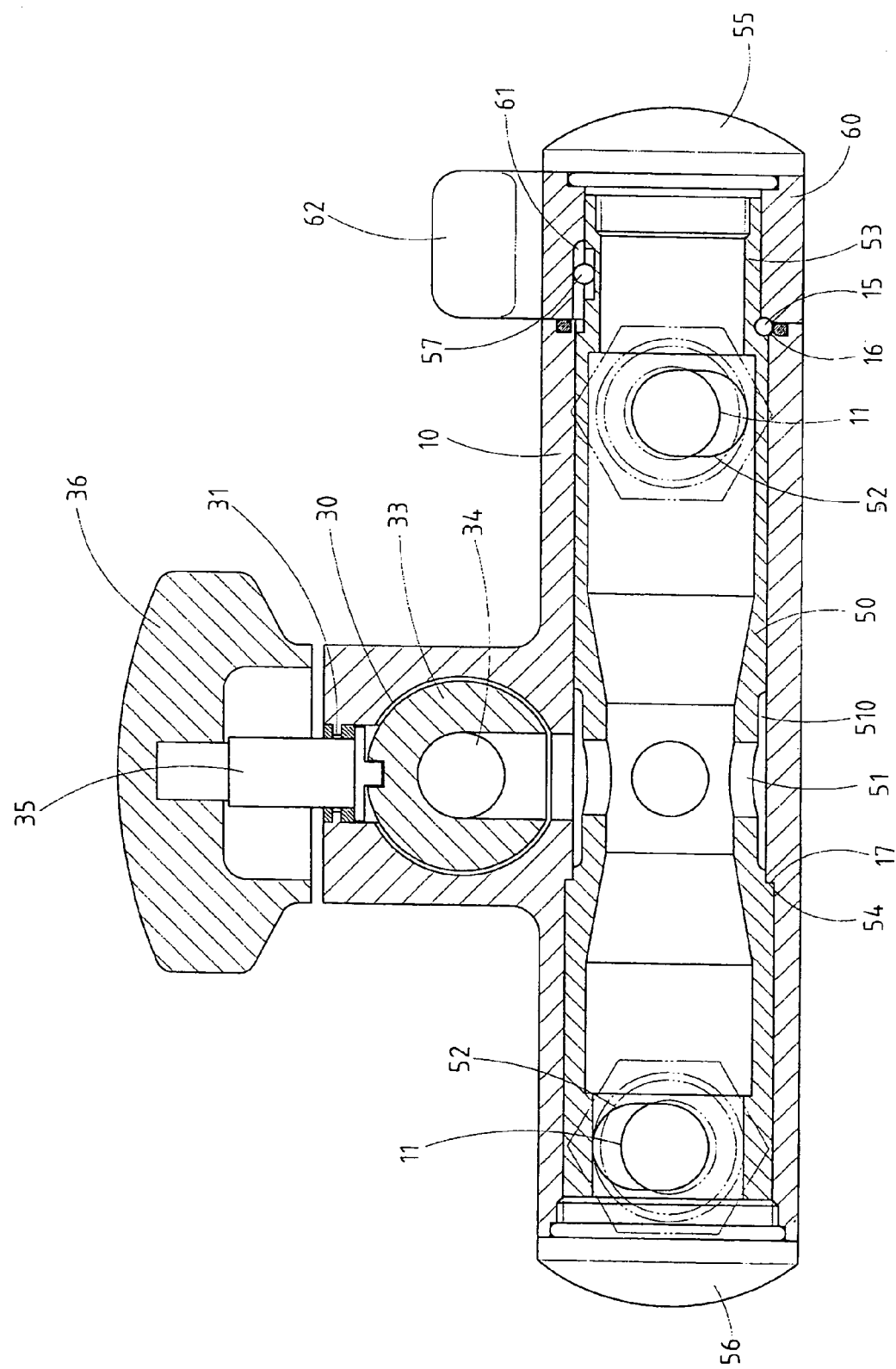
FIG. 7 shows a longitudinal sectional view of the present invention.
Figure 8:
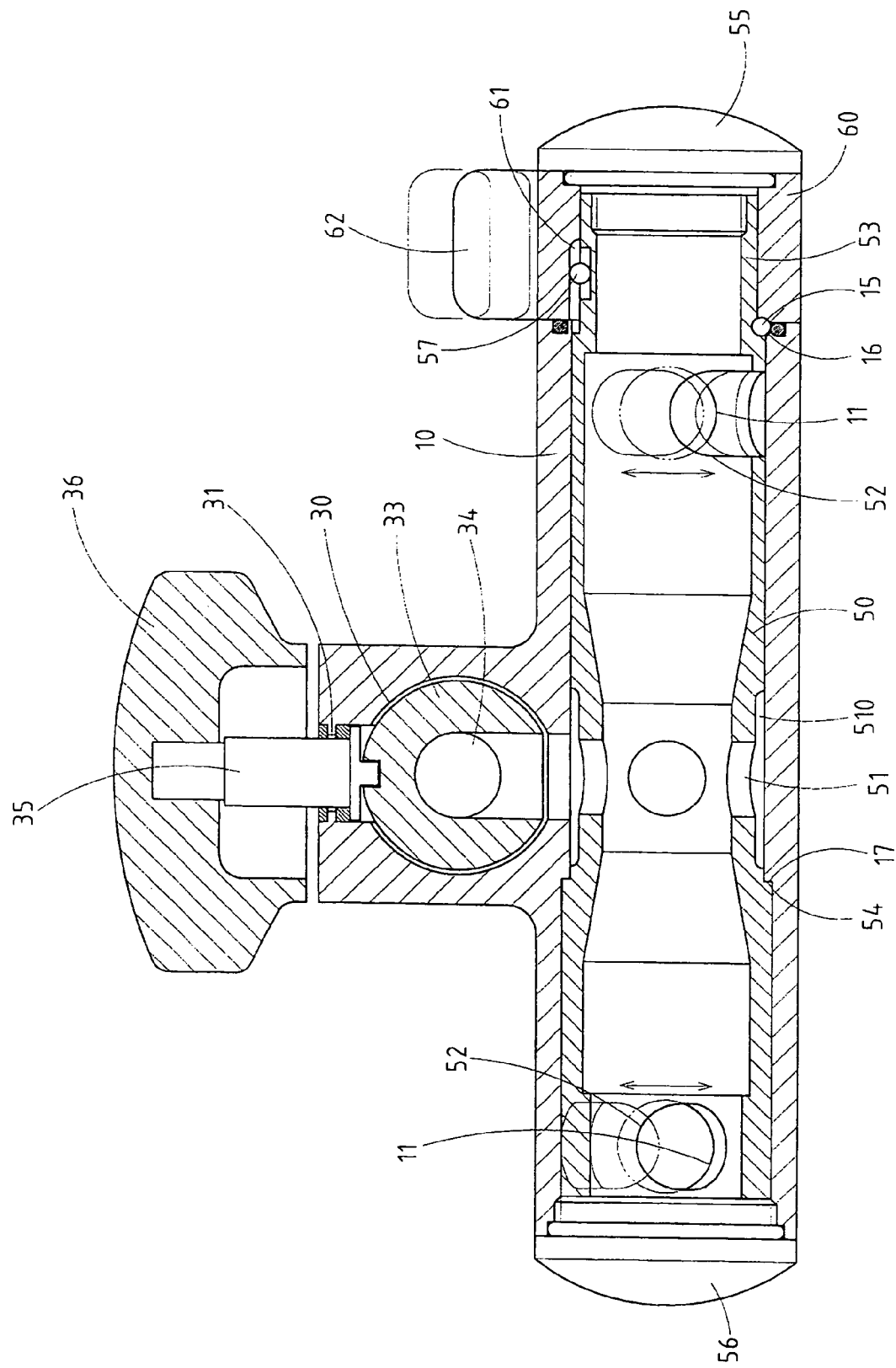
FIG. 8 shows a longitudinal sectional view of the present invention.
Figure 9:
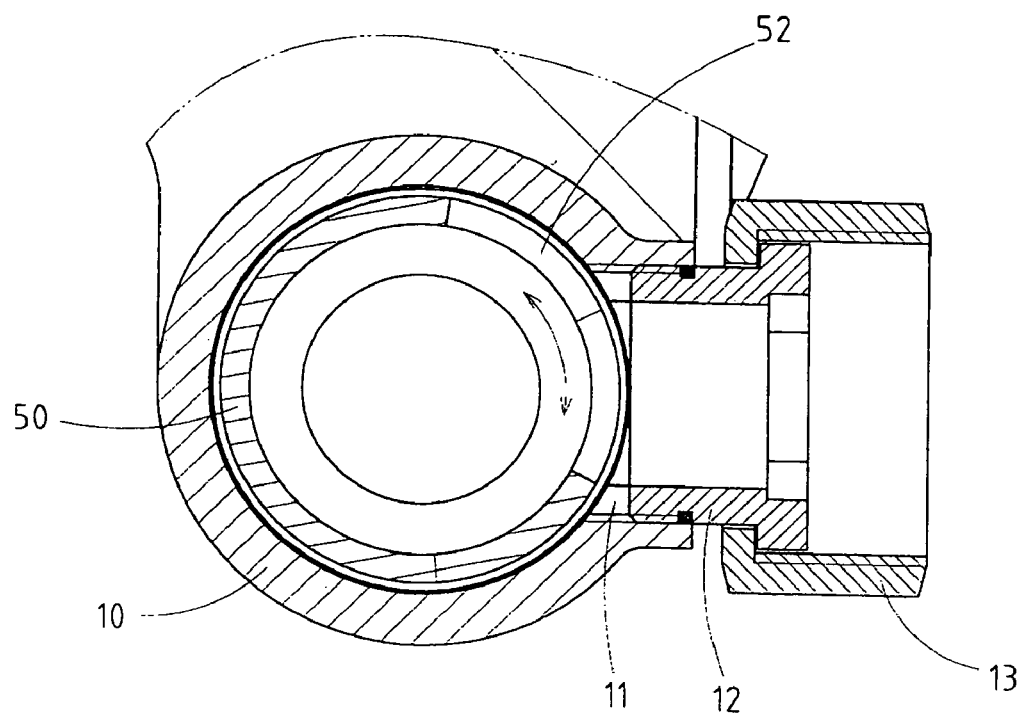
FIG. 9 shows a partial sectional view of the present invention at work.

In order to locate the shaft tube 50 in the inside of the main tube 10, the midsegment of the shaft tube 50 is provided with a locating portion 54, which is stopped by an arresting portion 17 of the main tube 10, as shown in FIGS. 7 and 8.

Figure 2:
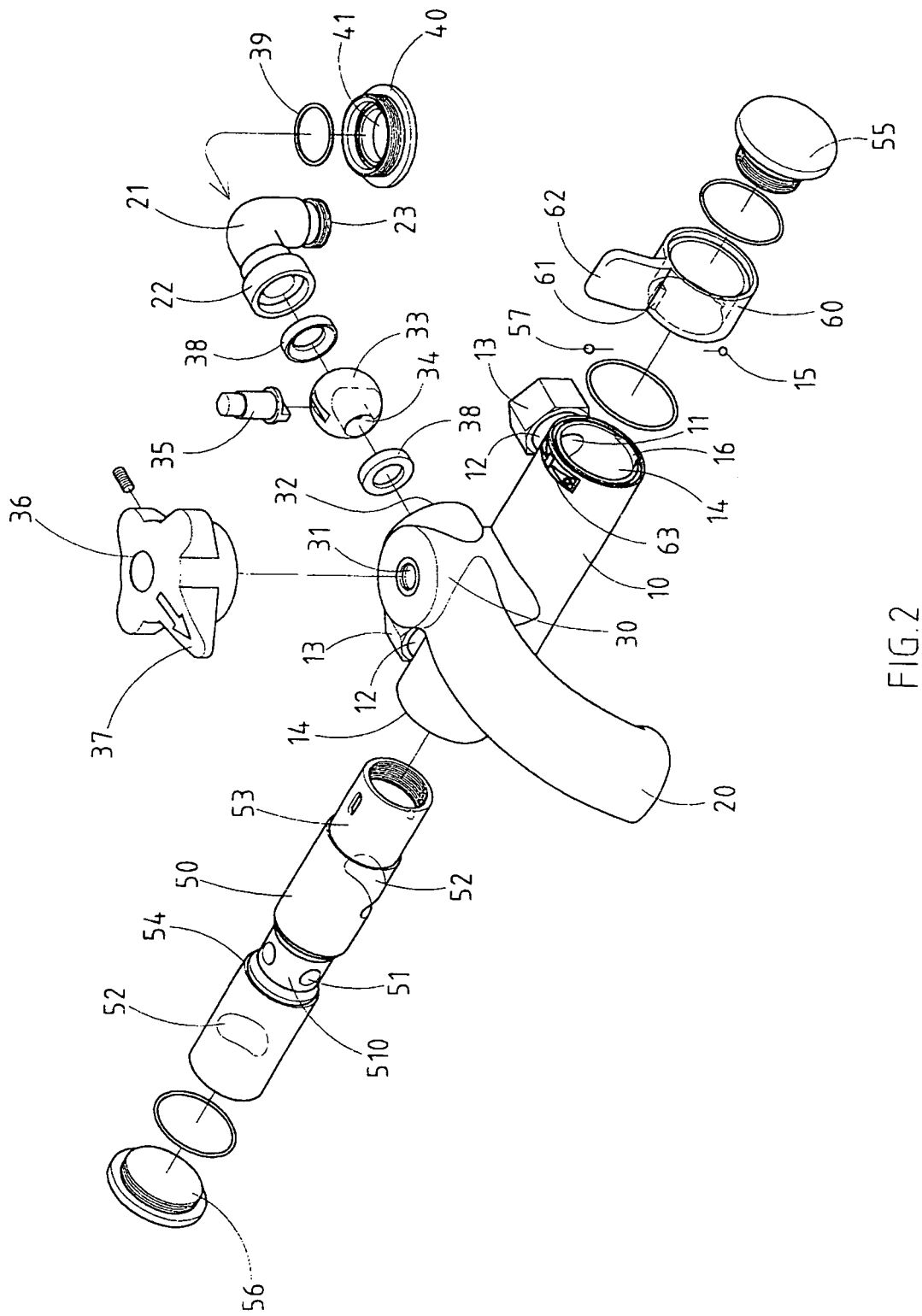
FIG. 2 shows an exploded perspective view of the present invention.
Figure 3:
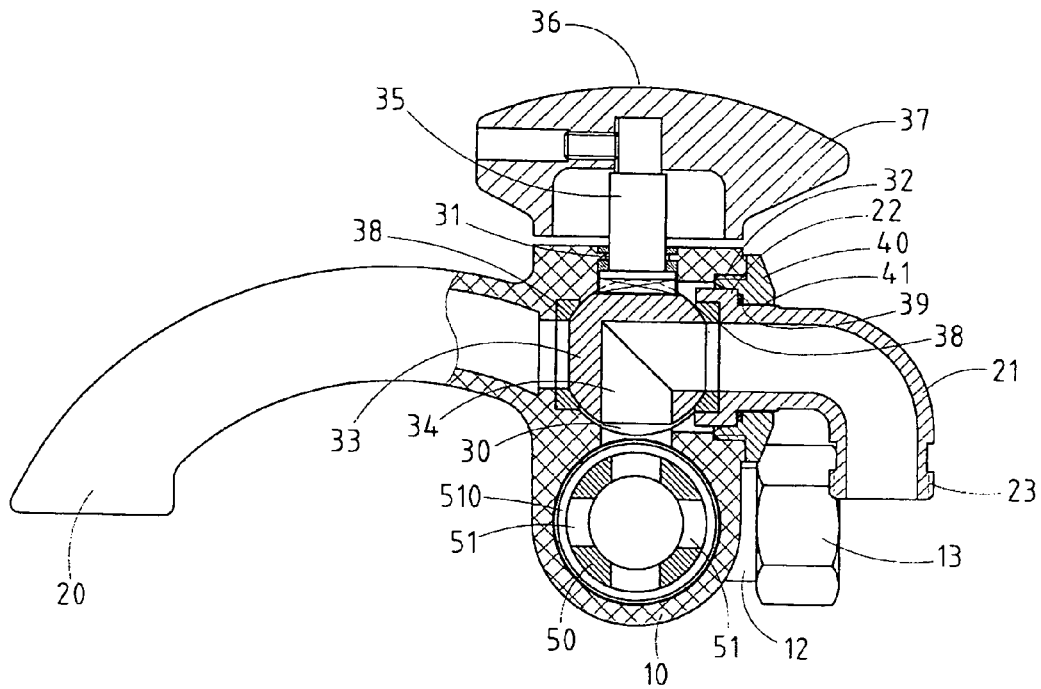
FIG. 3 shows a longitudinal sectional view of the present invention.
Figure 4:
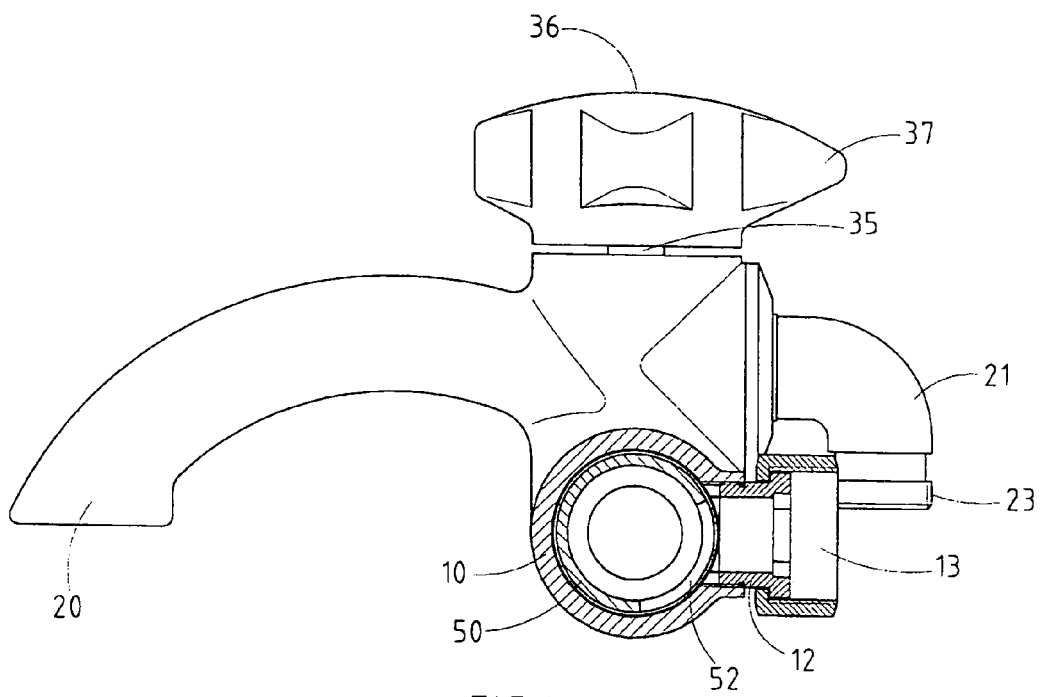
FIG. 4 shows another longitudinal sectional view of the present invention.
Figure 10:
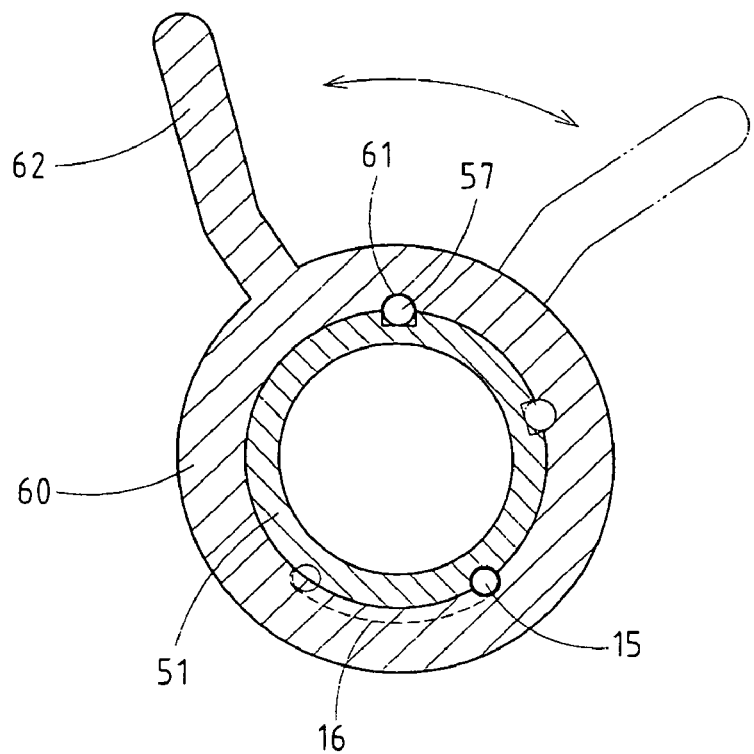
FIG. 10 shows another partial sectional view of the present invention at work.

As illustrated in FIGS. 2 and 10, the fastening end 53 of the shaft tube 50 is provided with a retaining block 57, which is retained in one of the retaining slots 61 of the inner wall of the selector 60. As a result, the shaft tube 50 can be actuated by the selector 60 to turn in relation to the main tube 10. The fastening end 53 of the shaft tube 50 is further provided with a confining block 15 corresponding in location to a confining slot 16 of the open end 14 of the main tube 10. The confining slot 16 has a predetermined length. When the shaft tube 50 is turned, the confining block 15 is moved in the confining slot 16, thereby confining the rotation of the shaft tube 50 so as to adjust the flows of hot water and cold water entering via the two alternate selection holes 52 from the fastening ports 11 of the main tube 10, as illustrated in FIGS. 7 and 8.

As shown in FIGS. 1 and 2, the selector 60 is provided with a dial projection 62. The outer wall of the open end 14 of the main tube 10 is provided with an adjustment angle pointer 63 opposite to the dial projection 62 of the selector 60.

As illustrated in FIG. 1, an indicator portion 37 of the rotary knob 36 has an arrow mark, which is pointing to the direction of the spout 20, via which the water is discharged. If the water is to be discharged by the hand-held shower head via the hose connector 21, the rotary knob 36 is so turned that the arrow mark of the indicator portion 37 of the rotary knob 36 points at the hose connector 21. The water flow is shut off by turning the rotary knob 36 such that the arrow mark of the indicator portion 37 points at neither the spout 20 nor the hose connector 21. In other words, the on-off mechanism of the cold-hot water faucet of the present invention is brought about by the ball valve 33 in conjunction with the rotary knob 36 by which the ball valve 33 is turned. The rotary knob 36 is so designed that it can not be easily interfered by the hose of the hand-held shower head at the time when the hand-held shower head is moved about by a user.

The cold-hot water adjustment mechanism of the faucet of the present invention is effected by the selector 60, and two selection holes 52 of the shaft tube 50 which are alternately disposed on the shaft tube 50. The cold-hot water adjustment mechanism and the on-off mechanism of the faucet of the present invention are independently set up.

The embodiment of the present invention described above is to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A cold-hot water faucet comprising:
a main tube comprised of two open ends opposite to each other and two fastening ports disposed respectively in proximity of said two open ends, with said two fastening ports being used to fasten respectively a cold water pipe and a hot water pipe, said main tube further comprising a valve chamber disposed between said two fastening ports, said valve chamber provided with a shaft hole and a fastening hole;
a spout extending from said valve chamber such that said spout is opposite in direction to said fastening hole of said valve chamber;
a ball valve provided with a shaft fastened thereto and disposed rotatably in said valve chamber in conjunction with two seal rings such that said shaft juts out of said valve chamber via said shaft hole of said valve chamber so as to fasten to a rotary knob by which said valve ball is actuated to turn, said ball valve further provided with a through hole to allow passage of water;
a hose connector fastened at one end to said fastening hole of said valve chamber;
a shaft tube comprised of, in a midsegment, a plurality of through holes, and in proximity of two opposite ends thereof with a selection hole, said shaft tube being rotatably fitted into said main tube such that said through holes of said shaft tube are corresponding in location to said valve chamber, and that said two selection holes of said shaft tube are corresponding in location to said two fastening ports of said main tube whereby said two opposite ends of said shaft tube and said two open ends of said main tube are respectively sealed off by a cap; and
a selector fastened to one of said two opposite ends of said shaft tube whereby said selector actuates said shaft tube to turn in relation to said main tube.

2. The cold-hot water faucet as defined in claim 1, wherein the midsegment of said shaft tube is a recessed portion.

3. The cold-hot water faucet as defined in claim 1, wherein said two selection holes of said shaft tube are alternately arranged.

4. The cold-hot water faucet as defined in claim 1, wherein said shaft tube is provided in an outer wall with a locating portion; wherein said main tube is provided in an inner wall with an arresting portion; wherein said shaft tube is fitted into said main tube in such a manner that said locating portion of said shaft tube is stopped by said arresting portion of said main tube.

5. The cold-hot water faucet as defined in claim 1, wherein the one of said two opposite ends of said shaft tube is provided in an outer wall with a retaining block; wherein said selector is provided in an inner wall with a plurality of retaining slots whereby said retaining slots serve to retain said retaining block of said shaft tube.

6. The cold-hot water faucet as defined in claim 1, wherein the one of said two opposite ends of said shaft tube is provided with a confining block; wherein one of the two open ends of said main tube is provided in an inner wall with a confining slot of a length; wherein said confining block of said shaft tube moves along said confining slot of said main tube at the time when said shaft tube is actuated by said selector to turn in relation to said main tube.

* * * * *